(No Model.)
F. T. GILBERT.
GRAVEL WASHING AND SEPARATING MACHINE.
No. 489,379. Patented Jan. 3, 1893.
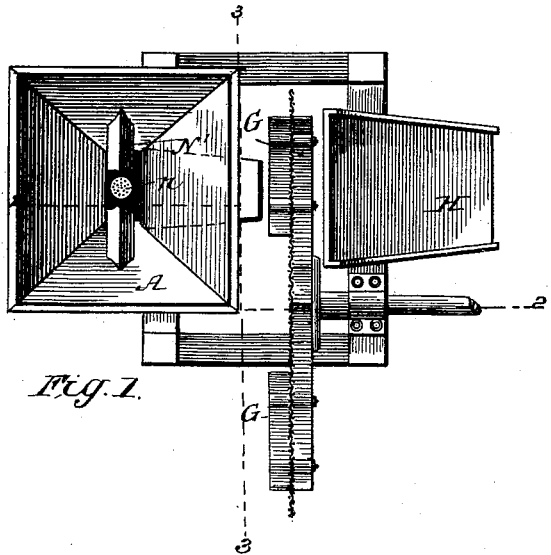
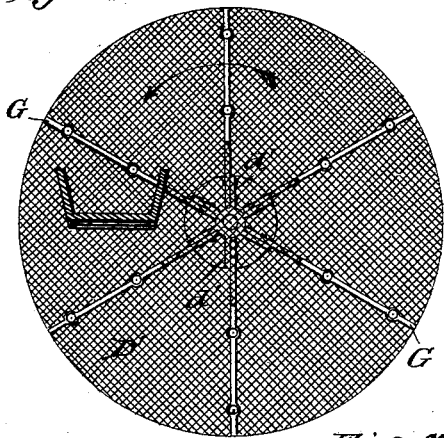
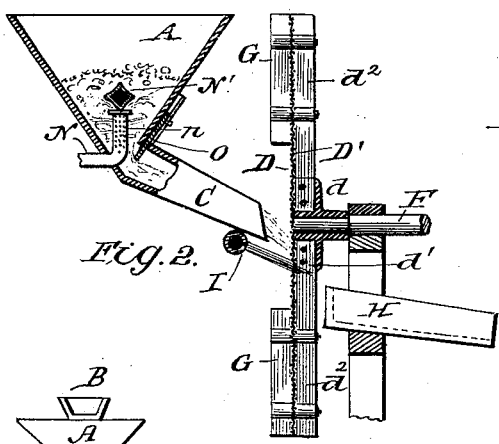
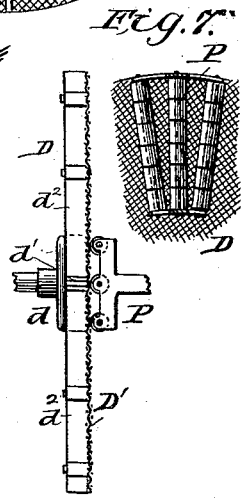
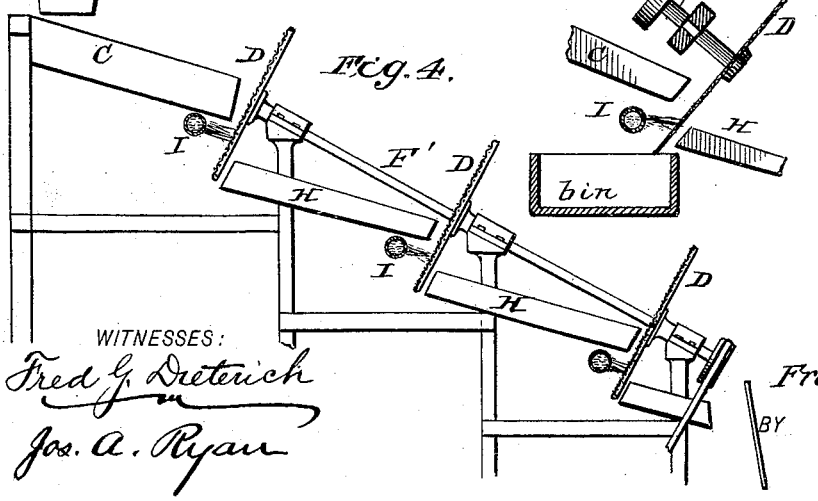
WITNESSES:
Fred G. Dieterich
Jos. A. Ryan
INVENTOR:
Franklin T. Gilbert
BY
Munn & Co
ATTORNEYS
THE NORRIS PETERS CO., PHOTO-LITHO., WASHINGTON, D. C.

UNITED STATES PATENT OFFICE.

FRANKLIN T. GILBERT, OF WALLA WALLA, ASSIGNOR TO SUSIE M. R. GILBERT, OF SEATTLE, WASHINGTON.

GRAVEL WASHING AND SEPARATING MACHINE.

SPECIFICATION forming part of Letters Patent No. 489,379, dated January 3, 1893.

Application filed March 11, 1892. Serial No. 424,592. (No model.)

*To all whom it may concern:*

Be it known that I, FRANKLIN T. GILBERT, residing at Walla Walla, in the county of Walla Walla and State of Washington, have invented certain new and useful Improvements in Gravel Washing and Separating Machines, of which the following is a specification.

My invention relates to a machine for washing, grading and separating gravel, and it has for its object to provide a machine of this character in which a continuous separation of the materials is obtained in a rapid, effective and economical manner.

My invention consists first, in a screen body or disk held to be rotated transversely to the direction of the feed of the material thereagainst.

It consists secondly, of a screening body formed with projecting portions arranged to receive the impact force of the mixed water and gravel as it is discharged against the screen, and upon which the gravel is temporarily lodged, the weight of which serves as additional means for rotating the screen.

It consists thirdly, in means for maintaining a continuous feed and a uniform consistency of the mixed material as it discharges from the hopper.

My invention consists finally, in the peculiar combination and arrangement of the parts hereinafter specified and claimed, it being understood however, that the several details of construction may be readily modified without departing from my invention, reference being had to the accompanying drawings in in which—

Figure 1 is a top plan view of the preferred form of my machine. Fig. 2 is a vertical longitudinal section of the same on the line 2—2, Fig. 1. Fig. 3 is a transverse section thereof on the line 3—3, Fig. 1. Fig. 4 illustrates a series of screens arranged to successively separate the coarser from the finer grades of gravel. Fig. 5 illustrates my improvements as applied to a hollow rotary screen. Fig. 6 illustrates a modified arrangement of the chute and screen hereinafter referred to, and Fig. 7 is a detail view hereinafter referred to.

Referring to the accompanying drawings, A indicates a hopper of any suitable construction into which discharges the flume B, which supplies the mixed water and gravel; it being understood, however, that when so desired, the gravel and water can be fed to the screen direct from the flume B; or the gravel to the hopper in a dry state and a volume of water discharged into such hopper from a reservoir, pump, or other supply, which washes and mixes with the gravel and passes into a suitably arranged chute C.

To provide for maintaining a proper consistency of the mixed material in the lower or discharge end of the hopper a jet pipe N is projected therein, the sides and top of which are perforated as at $n$, a deflector N' arranged over the top of such pipe serves to deflect the upper spray jet diagonally upward. In connection with this jet pipe N, an adjustable feed slide O is arranged over the discharge opening which in combination with the pipe N provides means for rendering the feed of the material uniform and in substantially the same consistency and effectually avoids the possibility of the hopper becoming clogged.

D indicates a screening disk which is disposed in front of the discharge end of the chute C and is journaled to rotate transversely or at right angles to the direction of the feed of the material. This screen can be mounted as shown in Fig. 2 upon a horizontal shaft F, or it may be (when used in connection with other screens to successively separate the different grades of gravel) mounted on a diagonally arranged shaft F' as shown in Fig. 4, or it may be in some instances disposed as shown in Figs. 2, 6 or 7, in fact the relation of the face of the screen disk to the discharge end of the feed chute or other supply may be at any angle whose inclination will be such as to permit the separated gravel to deflect or fall off. The shaft of the disk screen or screens is mounted on any suitably arranged supports, as an instance when the disks are to be rotated by the impact of the material thereagainst in a manner presently described the shaft is journaled preferably as shown in Fig. 1, when however other power is applied to such shaft it can be journaled as shown in Fig. 4, and when it is desired to obtain a more direct feed of the material, it may be supported in a manner similar to that shown in Fig. 6.

When steam or other power is applied to the screen shaft, the material can be discharged against the screen disk upon any part of its face, preferably however, on the lower portion and centrally thereof, as shown in Figs. 4 and 6. When, however, it is desired to automatically rotate the screen disk the feed chute is arranged to discharge the material on the downgoing side as most clearly shown in Figs. 1, 2 and 3. By the latter arrangement, the gravel and water as they are discharged against the screen cause it to rotate in the direction shown by the arrow (Fig. 3) such rotation being rendered continuous so long as the material is discharged thereagainst.

To render the rotation of the screen positive under all conditions, i. e. under a moderate as well as under a heavy volume of material, such screen is provided with a series of radially arranged outwardly extending arms G, which are adapted to receive the full force of the material and also serve as temporary rests for some of the gravel as it is carried down to be dropped, which arms may be of any form to accomplish the result claimed. It should be stated that while these arms serve to increase the impact force of the material against a screen body arranged to rotate transversely to the direction of the material it is manifest that they will effectually serve for the same purpose on a screen body in which the rotation is in the same direction as the feed of the material, as for instance in a hollow rotary screen, such as shown in Fig. 5.

By providing arms extended outwardly from the face of the rotary screen, the objections thereto hereinafter stated are to a great measure avoided, as the impact arms on the downgoing side prevent the material from falling off at a tangent and as they also temporarily hold some of the gravel, they are successively weighted and thereby aid in a more continuous rotation of such screen. In machines of this kind—and this is especially true where rotary screens have been employed on which the material is discharged in the same direction of its rotation the screening face soon becomes clogged and is rendered less useful for separating the different grades of gravel, and much of the material is thus forced off unscreened.

Any suitably arranged means may be employed to fasten the impact arms to the screens and the disks on the shafts; I prefer, however, to employ the means shown most clearly in Figs. 2 and 3, by reference to which it will be seen, the disk consists of the hub portion $d$ formed with radial members $d'$, to which the radial bars $d^2$ are secured. Over these bars is laid the screen body $D'$ proper, which is held secure by the arms G which are laid on the outside thereof, and bolted to the bars $d^2$, as shown.

Instead of fastening the impact arms on the disk as stated, the face of the disk may be reversed and the radial bars $d^2$ become the impact members as shown in Fig. 7. In this instance, the rear face of the screen will be a smooth face, and when used in this manner it is caused to contact with a rolling device P, which consists of a series of rollers mounted upon a shaft or shafts arranged radially to the said screen face, journaled in a suitable bearing P', and such rollers may have a rigid or yielding bearing face if desired. By arranging a roller device in the manner stated it will be noticed by providing a number of rollers on each shaft, enables each to work independently; those near the outer end revolving rapidly, while those near the center revolve slowly, thus avoiding the possibility of slipping.

H indicates a trough or chute into which the water and fine material are discharged as they pass through the screen. When a series of screens are used they are of a different mesh, the first being the coarser and the others successively finer, and the trough H of the first screen becomes the feed chute for the second and so on.

If desired the screen shaft may be driven by power transmitted from a water wheel operated by the waste water in a manner similar to that shown in my patent, No. 468,134, granted February 2, 1892, or it may be driven by steam or other power if desired.

As a further means for maintaining a clean screen face, assisting its rotation and washing the gravel as it is separated, a clean water jet pipe I is located under the feed end of the chute C, which may have a continuous jet aperture or a series of jet apertures which are located in such a manner as to discharge a sheet or sheets of clean water diagonally against the screen, so that its force will be exerted against the screen in the direction of its rotation. The gravel will as it is thrown off from the screen fall through such clean water jet and be further washed thereby. I desire it understood, however that I do not broadly claim in this application the use of a clean water jet, such as described, as such construction is more fully set out and claimed in another application filed by me on January 20, 1892, Serial No. 418,712.

Having thus described my invention, what I claim and desire to secure by Letters Patent is—

1. A gravel screening machine comprising a source of mixed water and gravel supply and disk screens held to rotate transversely to the direction of the force of the material against them, substantially as and for the purpose described.

2. In combination with a rotary disk screen, means for delivering water and gravel thereto upon its downgoing side, and a receiving chute on its opposite side, as and for the purpose described.

3. In a gravel screening machine, the combination with the means for feeding the mixed water and gravel to the screen, of a screen upon the downgoing side of which the material is discharged, said screen constructed with projections on its surface to temporarily hold a portion of the solid material, so that the revolution of the screen may thus be aided or effected as and for the purpose described.

4. In a gravel screening machine, a rotatable screen body projecting portions on its receiving face, for effecting or aiding its rotation, said projections adapted to receive the impact force of the gravel and water current, and serve as temporary rests for the solids deposited upon them by the current, as and for the purpose described.

5. In a gravel screening machine, in combination with the hopper, a deflector held therein, and a source of water supply piped into the hopper to discharge against the deflector, at or near the discharge end of the hopper substantially as and for the purpose described.

6. In a gravel screening machine in combination with a hopper, having a discharge a source of water supply piped into the hopper, having side discharge openings, at or near the discharge end of the hopper substantially as and for the purpose described.

7. In a gravel screening machine in combination with the hopper, a water supply pipe projected into the discharge end of the hopper formed with jet openings in its sides and top and a deflector over such supply pipe as and for the purpose described.

8. In combination, a series of feed chutes, and receiving chutes, rotary disk screens disposed between such chutes and mechanism for rotating such screens transversely to the direction of the discharge of the material thereon, substantially as and for the purpose described.

9. In combination with two or more chutes arranged to successively receive the material, a diagonally inclined shaft or shafts, screening disks held thereon and projected between the chutes and rotatable transversely as and for the purpose described.

10. In combination with the feed and receiving chutes, a transversely rotatable screen disk, disposed between such chutes and a fresh water jet or jets to intercept the deflected gravel and discharged against the screen in the direction of its rotation as described.

11. The combination with the supply and receiving chutes, of a screen disk rotatable transversely to the impact force of the material formed with radially disposed projecting blades or arms on its impact face, substantially as described.

12. In a gravel screening machine essentially as described, a screen disk formed of a hub portion, radial bars projected therefrom, a screen body and radially and outwardly projected arms all secured and arranged substantially as shown and described.

13. In a gravel screening machine essentially as described, in combination with a rotatable screen body, of a roller device, arranged to bear against the under or rear face of the screen, said device formed of one or more shafts arranged radially to the rear face of the screen, and a series of rollers loosely journaled thereon, all arranged substantially as and for the purpose described.

FRANKLIN T. GILBERT.

Witnesses:
SOLON C. KEMON,
FRED G. DIETERICH.